United States Patent [19]

Bibl

[11] 3,810,095

[45] May 7, 1974

[54] FONT OF DIGITAL, OR OTHER, CHARACTERS AND METHOD FOR PATTERN PRINTING THEREOF

[75] Inventor: Klaus Bibl, Belmont, Mass.

[73] Assignee: Lowell Technological Institute Research Foundation, Lowell, Mass.

[22] Filed: Oct. 24, 1972

[21] Appl. No.: 299,671

Related U.S. Application Data

[63] Continuation-in-part of Ser. No. 70,946, Sept. 10, 1970, abandoned.

[52] U.S. Cl. ...... 340/146.3 A, 178/30, 340/146.3 Z

[51] Int. Cl. .............................................. G06k 9/18

[58] Field of Search............... 178/30, 112; 197/1 R; 101/399, 398, 93; 340/146.3 A, 146.3 Z, 324

[56] References Cited

UNITED STATES PATENTS

| | | | |
|---|---|---|---|
| 2,944,735 | 7/1960 | Goldstern | 340/146.3 Z |
| 3,453,419 | 7/1969 | Torrey | 340/146.3 Z |
| 3,723,969 | 3/1973 | Thaddey | 340/146.3 Z |
| 2,604,532 | 7/1952 | Morrison | 101/399 |
| 3,444,319 | 5/1969 | Artzt et al. | 178/30 |
| 2,350,893 | 6/1944 | Holgaard | 197/1 |
| 3,530,456 | 9/1970 | Holoman | 340/324 |
| 2,265,445 | 12/1941 | Paris | 101/93 |
| 3,700,807 | 10/1972 | Drapeau | 178/30 |
| 3,130,397 | 3/1964 | Simmons | 340/324 |

*Primary Examiner*—Thomas A. Robinson
*Attorney, Agent, or Firm*—Pearson & Pearson

[57] ABSTRACT

A font of digital numerals, or other characters, has each character formed on one of a set of identical grid-like arrays each having a predetermined number of squares, each successive character in a series being depicted by a predetermined different number of filled squares arranged in the configuration of the character. The numerals one to 15 are each formed by four more squares than their respective values. Ditital data may be generated, electrically transmitted and printed in analog patterns with each number from zero to 15 requiring no more than 20 yes/no decisions.

13 Claims, 5 Drawing Figures

PATENTED MAY 7 1974

3,810,095

SHEET 1 OF 3

FONT OF DIGITAL, OR OTHER, CHARACTERS AND METHOD FOR PATTERN PRINTING THEREOF

BACKGROUND OF THE INVENTION

This application is a continuation in part of my application, Ser. No. 70,946, filed Sept. 10, 1970, now abandoned.

This invention relates to an improved method for electrically transmitting, receiving and printing statistical or other information, especially digital data, to produce an original, printed image which records the data with an analog appearance and with visually significant areas of darkness and brightness depending on the value of the numerals being printed. In addition to imprinting a message in an improved font of numerical characters, which can be read by a computer, or stored in a memory bank, the print-out in the font thus conveys an additional message visually by reason of the pattern produced by the varying intensity of the numerals of the font.

It is well known to transmit and receive data by radio frequency signals and to scan or print in response to such signals, when of the analog type, a suitable optical scanner or printer being commercially available for the purpose, for example "Magnafax" made by Magnavox Company, Torrance, Calif., and described in U. S. Pat. No. 3,325,821 of June 13, 1967, and U. S. Pat. No. 3,301,091 of Jan. 31, 1967. Such a multi-spot transducer is usually used to create a facsimile of an original document, or a facsimile of a printed sheet of data, all in a preselected font of conventional type and in a limited range of shades.

In the printing art, there have been many inventive shapes, symbols and screens, exemplified by the half tone type of U. S. Pat. No. 1,872,943 to Harvey of Aug. 23, 1932, and intended to translate the brightness variation of natural objects and scenes, into black area coverage of images which give the same impression to the eye as the original object or scene. Such type, however, has not been capable of creating images of computer and other systems out-puts for which there was never an original, or to digitally store brightness information directly or to record multi-dimensional frequency spectra, distribution functions or statistical graphs in readable form.

It has also been proposed to provide unusual fonts of numerical characters for sorting purposes, which can only be generated by mechanical printing of the whole font, each character progressively changing in intensity, for example: the progressively increasing coverage of a standard field of the numerals disclosed in U. S. Pat. No. 2,004,404 of May 7, 1935, or by each numeral having a different wave form for affecting the response of a slot scanner as in U. S. Pat. Nos. 3,000,000 of Sept. 12, 1961, 3,264,609 of Aug. 2, 1966, or 3,302,174 of Jan. 31, 1967.

SUMMARY OF THE INVENTION

However, while many prior patents show sets of numerical, or other characters, each on a grid-like array of squares, none teach a font in which each successive character in a series is formed on such a grid, in approximately its normal configuration by the use of the number of filled squares equal to a predetermined number of squares more than the value of its own position in the series. Thus, in the font of this invention, when forming the numerals 0 to 15, to enable analog printing by yes/no decisions, the numeral one is formed by five filled squares, thus constituting four more squares than the value 1. The numeral eight is formed by 12 filled squares, four more than eight, and so on. The zero of the font is formed by two filled squares, namely the top square and the centre square in the left column, whether the grid is three vertical columns of five squares to form numerals zero to nine, or is four vertical columns of five squares to form numerals zero to 15.

The novel font of the invention is generated by an apparatus which forms each numeral, or other character at high speed and converts the same to electronic pulse signals to which the stylus of a rotating transducer, or the styli of a multi-spot transducer, responds in reproducing the characters on copy or electrostatic sensitive paper. The resulting image is original, and not a facsimile, and the pulses may also be converted to acoustic signals to go over the telephone lines, if desired. Additional digital information can be conveyed by four gray-values of the number print-out.

DESCRIPTION OF A PREFERRED EMBODIMENT

Figure 1:
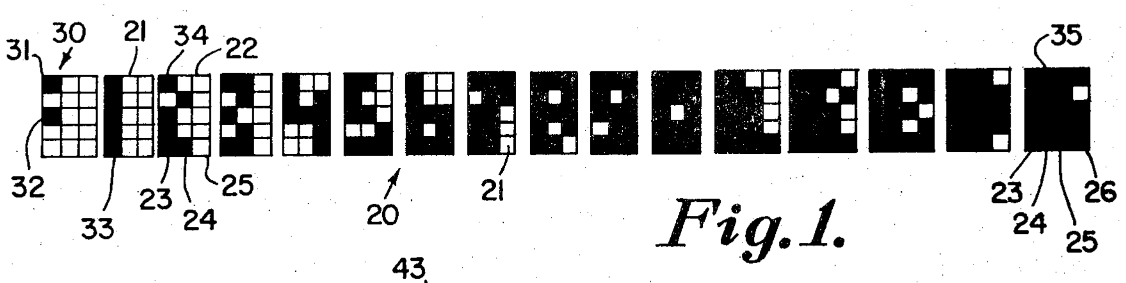
FIG. 1 is a plan view of the improved font of numerals of the invention.

As shown in FIG. 1, the improved font 20, of characters such as the numerals zero to 15, includes a set of identical grid-like arrays 21, each having 15 identical squares 22, arranged in three vertical columns 23, 24 and 25 of five squares each to represent numerals zero to nine and preferably having a fourth vertical column 26 of five squares 22 to represent the numerals zero to 15.

The numeral zero is depicted as at 30, by the darkened top square 31 and the darkened centre square 32 of the left column 23 and each of the succeeding numerals is depicted by a predetermined number of filled squares equal to its value, or position in the series, plus four squares. Thus the numeral one is depicted as at 33 by five squares, the numeral two as at 34 by six squares and so on up to the numeral fifteen as at 35 depicted by 19 squares. If a numeral 16 were to be used it would have 20 filled squares with a required larger matrix in order to keep the desired three-bit differentiation from all other characters.

The grid 21 is not shown with each representation, or print-out of each numeral, the printer recognizing its existence and operating to print each numeral from zero to nine, in response to 15 yes/no decisions, or to print each numeral from zero to 15 in response to no more than 20 yes/no decisions for each numeral of the font.

A significant and critical aspect of the invention is that the font 20 has been so designed that each successive numeral from one to nine not only is formed by a predetermined number of squares, or spots, directly related to its value, or position in a series, but the resulting number of squares have been configured in a pattern which is visually recognizable to the observer as the conventional arabic numeral one to nine. Thus the seven squares used to form numeral three are arranged in the configuration of a numeral three, the 10 squares of numeral six are configured as a numeral six, the thirteen squares of numeral nine are configured as a numeral nine and similarly for each of the other numerals from one to nine. A slight visual similarity is obtained in the numerals 10 to 15 of the font in that the 10 gives the impression of a zero, the 12 has an offset square similar to the two and the 13 resembles a combined one and three.

Another important feature of the font is the fact that the two squares 31 and 32, filled in to form the zero, are also filled in every other numeral of the font. These two squares are, therefore, usable to register or reregister the copy paper in a reader and to provide a grid for the location of each number, because the two mentioned squares are used whenever any printing of any numeral of the font takes place.

Still another important feature of the font is that at least three squares of each pair of the numerals are filled differently in different places of the matrix as an additional means by which the numerals can be visually, electrically or mechanically distinguished from each other.

For example, numeral 15 has an unfilled square in a location which is a filled square in numeral 14, and has two filled squares in locations which are unfilled in numeral fourteen. In descending order, the remaining numerals, if the above mentioned squares are similar, have other squares which are filled or unfilled so as to assure that every numeral, including zero, differs by three squares from all other numerals. For some applications a modified font for numbers below three can be preferable; no dot or only one dot in the left upper corner for zero, three or four dots in the first row for number one and five dots for number two in configuration X.

As a possible application only, a multi-spot transducer of the "Magnafax" or Xerox telecopier type such as the scanner-printer 40 usually consists of a rotating drum carrying a sheet of copy paper 41 and two styli hitting alternately, the paper moving pregressively sidewise until completely marked by the styli, whereupon the sheet is discharged through an end slot. The styli are inside the drum and arranged to be moved in response to electric pulses inwardly or outwardly to mark the paper 41. Such machines 40 are commercially available and can be connected to the apparatus 42 of FIG. 3, the apparatus 42 being the coder of the digital data to be printed as an original image on the copy paper 41. The device 40 can be arranged to scan and read data as well as to print data.

The font 20 is especially advantageous for display or printing purposes, because of the images made by the successive printed characters, or by the groupings thereof into light areas 43 of dark areas 44, but it also has unusually good scanning characteristics. The font can be recognized by either the area covered, the counted number of squares, dots or spots, the response curve of a slot scanner or more reliably, since it uses the built-in redundancy, by scanning the five used lines simultaneously or sequentially. Larger grid-like arrays such as the standard seven by five matrix for numbers do not significantly increase recognizability of the numbers, and, therefore, the standard 5 × 7 matrix is not used herein.

Figure 2:
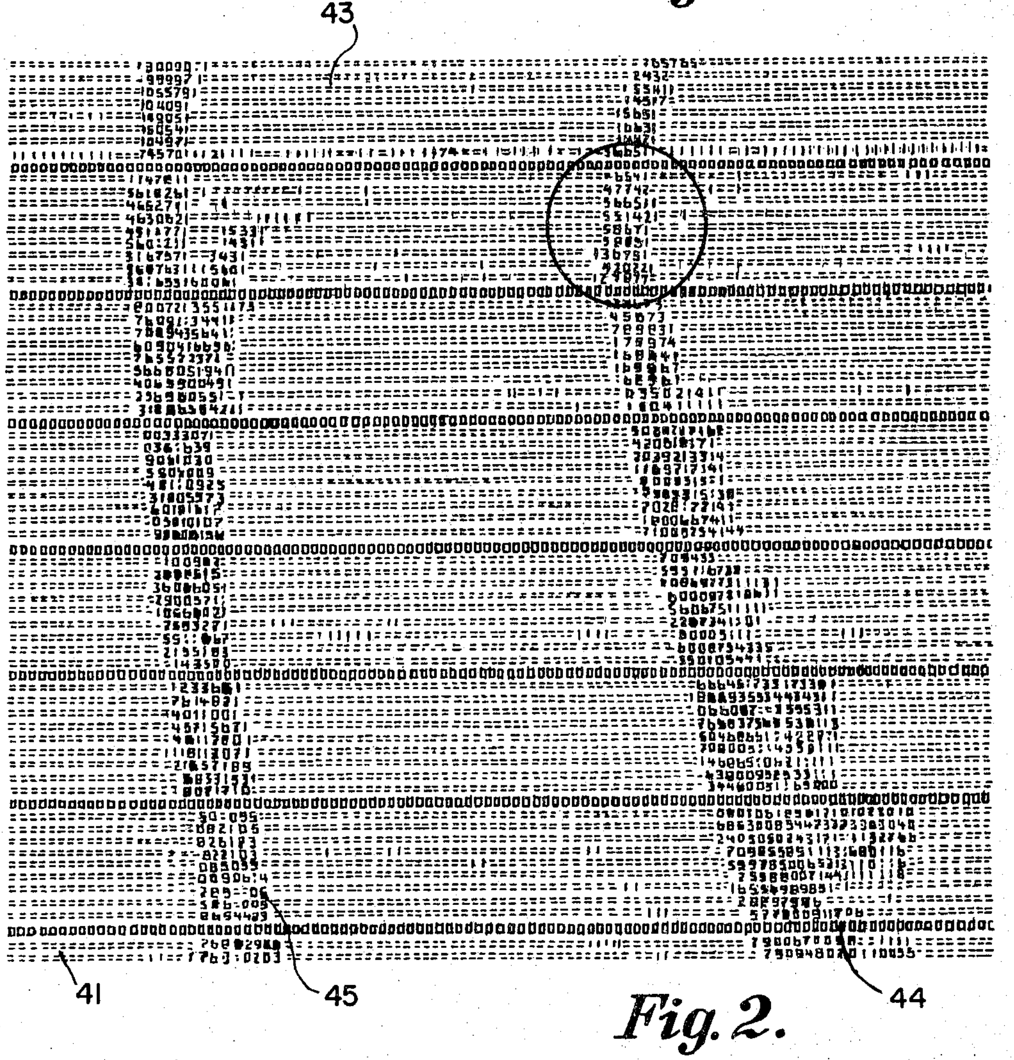
FIG. 2 is a plan view of a typical print-out using the font of the invention, a portion being magnified.
Figure 2A:
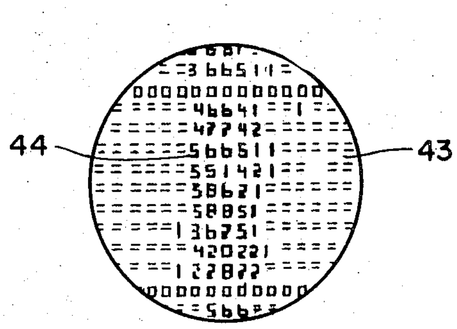
FIG. 2A is an enlarged, or magnified view of the portion encircled in FIG. 2.

As shown in FIG. 2, the font 20 of the invention is illustrated as it forms on copy paper 41 a display of amplitudes of ionospheric pulse sounding echoes as functions of delay and frequencies. It is a visual, original, image displaying the magnitude of complex amplitude as a function of frequency and range. The delay measures the height of the reflection and the frequency measures the local electron density at that height. Other examples of displays which can be formed in the font of the invention are reflection intensity of fish swarms as functions of water depth and location along the path of a ship, or airplane echo ranges as function of azimuth and elevation. The dark curved area 44 defines an arc which is repeated by the echo area 45, and both areas are set off by the lighter background area 43, all carrying a significant message visually to the evaluation expert. The images created by the printed font 20 on paper 41 have an analog appearance in that the patterns generated by the weight of the numbers, i.e. the number of used squares, or dots, have the appearance of images from objects including shape (boundaries) and brightness (black value) which are constant functions of the location of the image.

Figure 3:
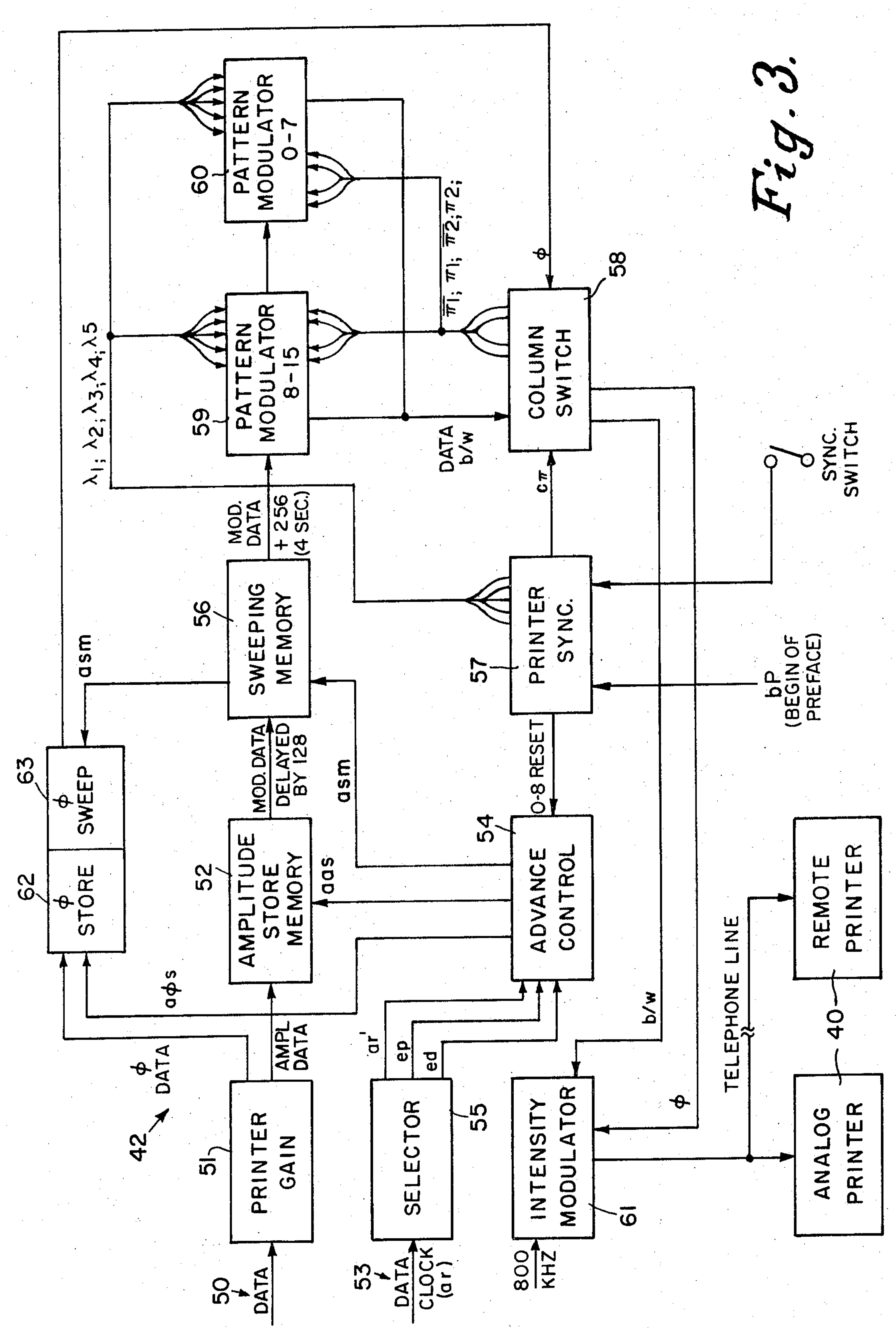
FIG. 3 is a schematic block diagram showing the digital formatting device used to produce a print-out such as shown in FIG. 2.

The block diagram of FIG. 3 illustrates schematically a printing apparatus 42 constructed in accordance with the invention to print the font 20 in response to signals received at 50.

Data accepted by the device consist of six to nine bit numbers, organized in one or more characters. In the simplest case, six bits form a character. Printer gain card 51 selects from these six bits four consecutive ones, either the least significant, the intermediate, or the most significant bits which are offered to the Storage Memory Card 52.

Dependent on the desired format of the print-out a selection of these consecutive characters are stored in the memory by advancing the shift registers of the Storage Memory Card 52 at the times, indicated by the data clock 53 when the respective data is ready. Thus, arrangement of the data is done by the sequence of the advance pulses created in the Advance Control Card 54. This card is supplemented by the Selector Card 55 which, with the help from preface pulses and end-of-record indicators, separates between data and interlaced identifiers. The programmed switching between data and identifier is one of the most prominent features of digital data pattern printing.

Depending on the data format, the Selector Card 55 produces the modified data clock ar', the elect preface (ep) and the elect data (ed) period. Those three functions steer the Advance Control Card 54. From Printer Sync Card 57 the Advance Control Card 54 receives an additional command (0–8) during which time the transfer of data from the store to the sweep memory takes place. For that purpose, each of the three output functions: aas = Advance Amplitude Storage 52, asm = Advance Sweeping Memory 56 and 63, and a$\phi$s = Advance Phase Storage 62 contain two sequences, the fast transfer and the slow input or output sequence. The slow input sequence is synchronous with the modified data rate, transferred from the Printer Gain 51 to the Store Memory 52. The slow output of the Sweeping Memory 56 repeats the data six times to scan the six lines of which each character line consists.

With the help of the Printer Sync Card 57, which creates the six lines and the Column Switch Card 58 where the four rows are generated, this repeated data output of the Sweeping Memory Card 56 drives the pattern modulator cards 59 and 60 which create the 20 yes/no decisions per character. These decisions are transformed in the Intensity Modulator Card 61 into a frequency modulated square wave sequence used as yes/no electrical signal which steers the analog printer 40 locally or remotely. The frequency of this square wave controlled by the $\phi$ Sweep Memory 63 is responsible for the gray value of the dots which form the font of the numbers.

It will be understood that the means for generating information is the intensity modulator 61, that the means for transmitting the generated information to a remote area is the telephone or radio link shown, and the means for reproducing the so generated and transmitted information is the analog printer and remote printer 40, all of this apparatus being well known. In this invention, the means for controlling the intensity of each character in the font, to cause not only each character, but also the entire reproduction to carry a visual message, has been combined with such apparatus to produce a new combination and result. The intensity controlling, or modulating, means is the intensity modulator 61 which converts the yes/no decision into a frequency modulated square wave sequence, the frequency being controlled by the $\phi$ sweep memory, all in a manner which will be apparent to those skilled in the art.

Figure 4:
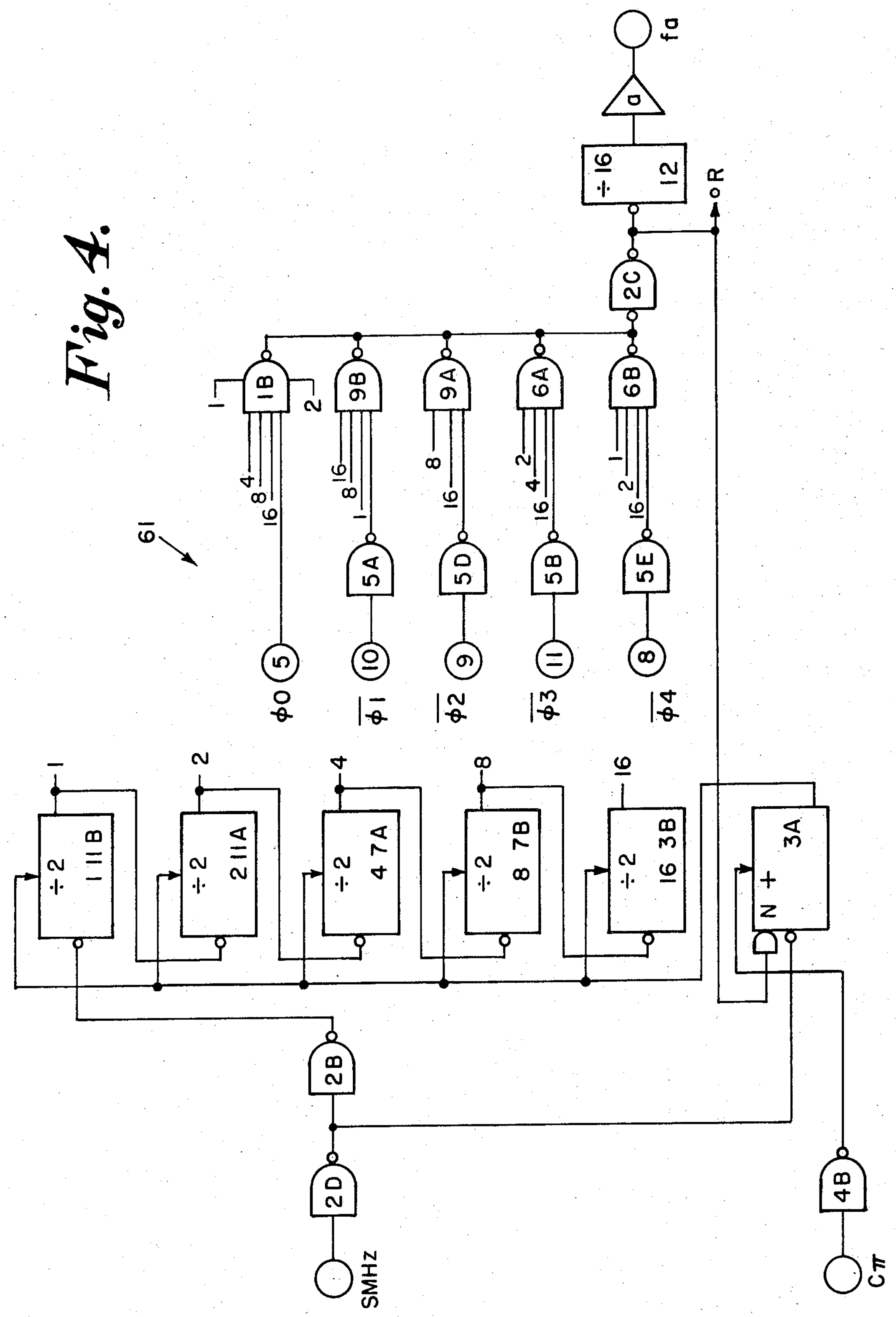
FIG. 4 is a circuit diagram of the intensity modulator of the invention.

The intensity modulator 61 is shown in FIG. 4 and performs its function as follows.

The command "print dot" that is contained in the $\phi$-inputs must be transformed into an analog signal of frequency fa and an amplitude of 0.1 Vrms for the printer that is used. Frequency fa can have values between 1.5 and 2.5 kHz controlling the intensity (gray values) varying from white through gray to black. The Intensity Modulator 61 generates fa from the system clock of 0.8 MHz by division in the flip-flop chain 11B, 11A, 7A, 7B and 3B. The frequency division is determined for each individual dot by $\overline{\phi 1}$, $\overline{\phi 2}$, $\overline{\phi 3}$ and $\overline{\phi 4}$ corresponding to four distinct and different gray values. Pulse chain R is divided by 16 in chip 12 and the resulting square wave of varying period is buffered in the amplifier *a*. Function $\phi 0$ controls synchronization of the printer by alternating fa between 1.5 and 2.5 kHz in a sequence required by the printer for its synchronization.

I claim:

1. A font of numerical characters ranging in value at least from zero to nine, said font comprising at least 10 identical grid-like arrays of identical squares, each array having at least three vertical columns of five identical squares each thereby totalling at least 15 squares in each array;

each said numerical character, from one to nine, being formed on one of said grid-like arrays by a number of filled squares thereof equal to four more than the value of said character, arranged in a pattern depicting the said numerical character, the number of filled squares depicting the character being directly related to the value of the numeral and the optical recognition scanning and printing characteristics of the said numeral being directly related to its numerical value, and the zero numeral character being formed on one of said grid-like array by at least one square, if desired, of the left vertical column thereof.

2. A font of numerical characters as specified in claim 1, wherein:

the filled squares of each said grid-like array, representing any one of the numerical characters from zero to nine, always include the top filled square and the centre filled square of the left vertical column thereof, whereby said top and centre squares may be used for registration of said numerical characters in printing.

3. A font of numerical characters as specified in claim 1, wherein:

each said numerical character formed by said filled squares differs from any other said character in having at least three squares of each numeral in different places of the grid-like array differently filled or empty.

4. A font of numerical characters as specified in claim 1:

plus five additional grid-like arrays of said identical squares, each array having a fourth vertical column of five said identical squares thereby totalling twenty squares in each said additional array:

each said additional array representing one of the numerical characters from 11 to 15, by a number of filled squares thereof equal to four more than the value of said character;

the density of each said numeral, and its optical recognition, scanning and printing characteristics being directly related to the number of filled squares in its array.

5. A font of the numerals from zero to nine, said font comprising a set of 10, three by five square grids, each having a left, centre and right vertical column, one grid having the top and centre squares in the left column filled to represent zero, and the remaining grids, each having four more squares than the value of one of the numerals from one to nine filled to depict the numeral, the said numerals from one to nine thereby being visually recognizable as numerals while the number of squares thereof optically indicates the value of the numeral to a scanner.

6. A font of numerical, or other characters comprising:

a plurality of identical grid-like arrays identically formed of a predetermined number of squares, a series of successive characters, each formed on one of said arrays by a number of filled squares thereof equal to four more squares than the number of the position of said character in said series, whereby the first said character is depicted by five squares, the second by six squares and so on to the end of the series, and each said number of filled squares on each said array being arranged in a configuration at least partially depicting the normal appearance of said character, whereby each said character in said series is visually recognizable and its relative numerical position in the series may be automatically optically sensed by the number of filled squares thereof.

7. A font of numerals from zero to 15, said font comprising:

16 identical grid-like arrays having no more than four vertical columns of five squares each;

one grid having the top square and centre square in the left column filled to represent zero, the remaining grids each having four more squares than the value of its number from one to 15 filled and configured to visually represent the numeral, the number of squares of each numeral being directly related to the value thereof, whereby each numeral array of 20 squares requires only 20 yes/no decisions of an optical scanner to generate, or sense, the said numeral.

8. A system for digital pattern printing with analog appearance of digital data, said system comprising:

a font of numerals at least from zero to nine, each formed by filled squares on a three by five square grid the numerals from one to nine each being configured to depict the said numeral in four more filled squares than the value of the numeral, means for generating information in said font of numerals by digital electrical, or mechanical means, using no more than 15 yes/no decisions for each said numeral, means for transmitting the so generated information to a geographical area remote from the generating source thereof, and means for electrically, or mechanically, reproducing the said information in said font of numerals, and means for modulating the intensity, density or darkness of the filled squares of the various said numerals from zero to nine, said modulation conveying visual information by proximity to other numerals and by the resulting light or dark pattern in the said reproduction.

9. A system for printing an original image in recognizable and significant pattern of multi-spots, in response to electric signals carrying numerical statistical information obtained at a remote source, said system comprising the steps of:

providing a font of multi-spot numerals from zero to nine, in which each said numeral is shaped in substantially its normal configuration in a pattern of identical spots equal in number to four more than the value of the numeral, whereby numeral one has five spots, numeral two has six spots and so on, the zero of the font having only two spaced apart spots, then transmitting said information by said electric signals from said remote source and printing an original image thereof at a receiving station, said image having digital brightness and darkness variation in accordance with the individual values and black area coverage of the numerals of said font, thereby producing a recognizable and significant pattern in said spots.

10. A system as specified in claim 9, plus the step of storing the said numerical statistical information in the form of said original image for later use as input to a computer or other systems inputs.

11. A method for transmitting, receiving and printing numerical or other characters without using an entire conventional font of such characters, said method comprising the steps of:

establishing a font of numerals from zero to nine, each in a number of squares four more than the value of the numeral on a matrix having at least three columns of five squares, by darkening certain squares to depict the character, then generating information in such characters electrically in a predetermined number of yes/no electric signals for each character and transforming said signals into a frequency modulated, square wave sequence at one location and transmitting the same to another location;

then receiving said characters at said another location in response to said yes/no electric signals and printing said numerals in juxtaposed columns in an original image which varies in number of filled matrix squares with the value of the said numerals printed thereon.

12. The method of printing out digital data generated by scanning digitizers, play-back data storage devices or the like from digital raw data or computer out-puts which comprises the steps of:

providing a font of digital characters, at least from zero to nine on a three by five square grid, each comprising a predetermined, different number of identical dots equal in number to four more than the value of the character so as to be based directly on the value thereof, then printing out said characters in easily recognizable and informative analog patterns of digital information and simultaneously printing out said digital information with additional digital information in said characters in the form of interlacing identifiers including technical parameters, time, location or other identifiers readable by human eyes or scanning devices.

13. The method of printing out digital data as specified in claim 12, plus the steps of:

converting said font into yes/no decisions and transforming said decisions into a frequency modulated, square wave, sequence to vary the grey valves of the print-out and transmitting and printing additional digital information by controlling the said grey value of the printed characters in at least two levels.

* * * * *